3,167,450
COATED ARC WELDING ELECTRODE
Masao Koibuchi, 1013-5 Inazukecho, Kitaku, and Takashi Kataoka, 1011-5 Higashi, Komatsugawa, Edogawa-ku, both of Tokyo, Japan
Filed June 26, 1961, Ser. No. 131,036
Claims priority, application Japan, July 5, 1960, 35/30,036/60
9 Claims. (Cl. 117—206)

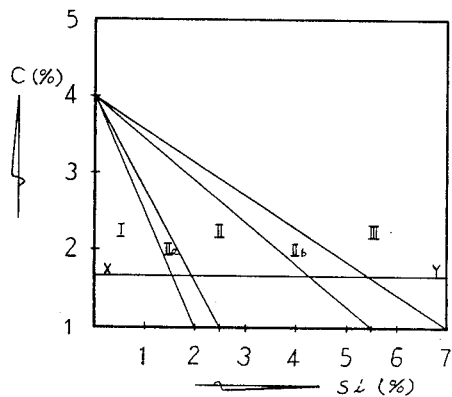
*Fig. 1.*
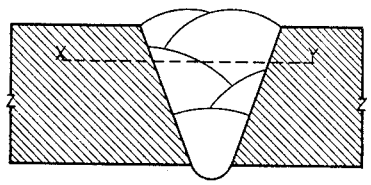
*Fig. 2.A*
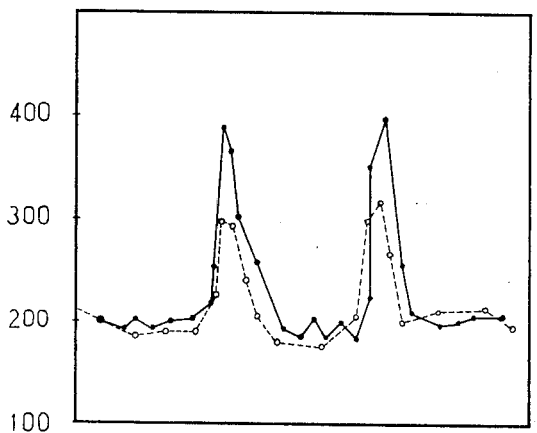
*Fig. 2.B*
Inventors
MASAO KOIBUCHI
TAKASHI KATAOKA
By Holcombe, Wetherill, Brisebois
Attorneys United States Patent Office 3,167,450
Patented Jan. 26, 1965

This invention relates to a novel type of coated arc welding electrode, details of which will be apparent from the following description, when read in connection with the accompanying drawings, wherein:

FIG. 1 shows the Maurer equilibrium diagram representing the relationship between silicon and carbon in the cast iron composition.

FIG. 2A illustrates the section of a 12 mm. thick pearlite cast iron piece butt-welded using an electrode of the present invention.

FIG. 2B gives the results of Vicker's hardness measurements of the section of FIG. 2A along the line XY.

The present invention relates to a coated arc welding electrode for cast iron, which utilizes as core a well-known cheap mild steel or carbon steel and is provided with a coating as proposed by the present invention, with the result that the deposited metal thus obtained possesses a perfect cast iron composition which assures less crack-sensitivity and better mechanical properties.

Generally speaking, in the process of cold arc welding intended to impart a cast iron texture and composition to the deposited metal, the metal deposited by welding arc is once melted and then rapidly cooled by the base metal. In consequence it is absolutely impossible to prevent formation of a hardened layer, even if the composition of deposited metal is selected so as to make it more liable to develop free carbon under rapid cooling after welding.

As is evident from the Maurer equilibrium diagram in FIG. 1, the factors producing a texture and composition of soft cast iron in the welding of cast iron are two constituents, i.e., carbon and silicon; the cast iron will acquire the most soft texture when the contents of said elements fall within the region III of said equilibrium diagram.

However, in the case of a common steel wire being adopted as core, it would be impossible to get a deposited metal containing a rich amount of silicon in addition to carbon, even if an arc welding electrode provided with a special coating is used, for silicon would be readily oxidized by a high temperature welding arc and lost in the slag. For this reason it has remained unrealized up to the present to get a higher than 4% silicon content in the deposited metal when an arc welding electrode with common steel wire as core is used, even though it may be possible to increase its carbon content.

To overcome this difficulty, first a coated arc welding electrode (Japanese Patent No. 192,339 and Japanese Patent No. 5,459, 1960) was successfully developed which used a high-silicon steel or a high-silicon cast iron with a rich silicon content as core so that the composition of the deposited metal might fall within the region III of the Maurer diagram. This electrode is currently marketed.

Both of such cores are, however, expensive and, having high electric resistance of their own, are apt to get heated and develop blow-holes.

We, the present inventors, engaged for many years in the production and research of cast iron arc welding and welding electrode used for it, observed that the hardened layer of deposited metal could steadily be reduced through improvement of the composition of deposited metal for proper adjustment of silicon and carbon contents. Based on this observation, we pursued various experimental studies and finally succeeded in perfecting a coated arc welding electrode capable of producing a deposited metal with a satisfactory cast iron texture and composition; said coated arc welding electrode being obtained by increasing the contents of silicon carbide, ferro-silicon and graphite in the coating materials for the purpose of graphitizing the silicon and carbon in the deposited metal, and by applying a cheap, commercial core with a flux composed of such compounds of alkali metal and alkaline earth metal as potassium fluoride, sodium fluoride, etc., which stabilize the welding arc, elevate the deposit efficiency, and facilitate the welding operation; and of the coating materials for common mild steel arc electrodes.

Details of the present invention are further illustrated as follows:

TABLE 1

*An example of composition of coating material*

|  | Percent |
|---|---|
| Silicon carbide (Carborundum) | 40 |
| Ferro-silicon | 20 |
| Graphite | 15 |
| Mica powder | 3 |
| Calcium carbonate | 5 |
| Calcium fluoride | 17 |

By mixing a coating material of such composition as illustrated in Table 1 with sodium silicate, Baumé 35°, and applying under pressure a high-carbon steel wire (diameter 4 mm.) of the composition as listed in Table 2, with the resulting mixture to an outer diameter of 5.90–6.00 mm., a welding electrode can be obtained which can give a deposited metal with its composition fully within the limits of the region III of the Maurer diagram.

TABLE 2

| Element | Core Composition, Percent | Deposit Metal Composition, Percent |
|---|---|---|
| Carbon | 0.87 | 3.19 |
| Manganese | 0.52 | 0.48 |
| Silicon | 0.18 | 5.52 |
| Phosphorous | 0.022 | 0.044 |
| Sulphur | 0.025 | 0.041 |

The above is a case of a rich amount of carbon being contained in a wire used as core of electrode. But, even in the case of a mild carbon steel core being used which has such composition as indicated in Table 3, a satisfactory electrode that can give a deposited metal with the composition as listed in the right column of Table 3 fitting the region III of the Maurer diagram can be obtained, provided the composition of the coating material is accordingly modified, that is, changed to one as listed in Table 4 and similar conditions are observed in pressure-application of similar coating material on the core.

TABLE 3

| Element | Core Composition, Percent | Deposit Metal Composition, Percent |
|---|---|---|
| Carbon | 0.07 | 2.71 |
| Manganese | 0.42 | 0.38 |
| Silicon | 0.02 | 5.32 |
| Phosphorous | 0.011 | 0.023 |
| Sulphur | 0.013 | 0.033 |

TABLE 4

*Another example of composition of coating material*

| | Percent |
|---|---|
| Silicon carbide (Carborundum) | 35 |
| Silicon iron | 20 |
| Graphite | 20 |
| Mica powder | 3 |
| Calcium carbonate ($CaCO_3$) | 5 |
| Calcium fluoride ($CaF_2$) | 17 |

Thus, the object of the present invention is to give a deposited metal of a specified composition by changing the blending ratio of the coating material of an electrode, depending on the carbon content of the core.

According to the purposes to which they are intended, the coating materials may be classified into three categories; namely, the first category including silicon carbide (SiC), silicon iron and graphite, the second one including calcium fluoride ($CaF_2$), cryolite ($Na_3AlF_6$), sodium fluoride (NaF), potassium fluoride (KF), and the third one including various oxides and carbonates. In the present invention the materials belonging to the first and the second category constitute vital factors, an appropriate combination of which plays an important role in transforming the steel wire into a deposited metal of cast iron composition. Silicon carbide is what is popularly called "Carborundum," and represents a compound of one Si molecule and one C molecule. Ferro-silicon is an iron alloy containing more than 15% of silicon. Graphite is a kind of transformed carbon.

Unlike the arc welding electrode for mild steel, the arc welding electrode for cast iron is required primarily to provide a crack-free deposited metal for the weld; and the welding stability is deemed of secondary importance.

In an electrode of the present invention, the blending material (hereafter to be called a flux) of the first category is in the welding arc enveloped with the non-oxidizing gas of a flux of the second category, while through an increased deposit efficiency of a flux of the first category the main constituents, i.e., carbon and silicon in the flux of the first category is made to pass into the deposited metal. Thus, the composition of the deposited metal comes to fall within the limits of the region III of the Maurer diagram.

Meanwhile a flux of the third category has the function to improve the welding stability of a blending of materials belonging to the first and the second category and at the same time form a slag in the course of welding, said slag covering the deposited metal and slowing down the rate of its cooling. Whereas the fluxes of the first category are simple substances or metal alloys and the ones of the second category are fluorides, the ones belonging to the third category are predominantly oxides of different elements. Oxides of alkali metals such as $K_2O$, $Na_2O$, alkaline earth metals such as CaO, BaO, oxides of bivalent metals such as MuO, MgO, FeO, or oxides of polyvalent metals such as $Al_2O_3$, $TiO_2$, $SiO_2$ are regarded indispensable coating materials of electrode also from the standpoint of arc voltage regulation (see Journal of Japan Welding Society, vol. 20, No. 7, p. 240, Koibuchi; Journal of Japan Welding Engineering Society, vol. 5, No. 3, p. 145, Shibata, Koibuchi). These oxides occur in nature respectively in the form of compounds: feldspar ($K_2O.Al_2O_3.6SiO_2$), talc ($3MgO.4SiO_2H_2O$), asbestos ($MgO.CaO.4SiO_2$), mica $$(K_2O.3Al_2O_3.6SiO_2.2H_2O)$$

ilmenite ($TiO_2.FeO$), kaoline ($Al_2O_3.2SiO_2.2H_2O$), lime ($CaCO_3$), manganese carbonate ($MuCO_3$), barium carbonate ($BaCO_3$), manganese dioxide ($MuO_2$). Therefore, in the present invention one or more than two kinds of the above-mentioned natural ores are mixed with fluxes of the first or the second category to produce an arc welding electrode.

The present invention aims first at increasing the carbon content of deposited metal by more than 2% and the silicon content of it by more than 4% through coating of a mild steel core or hard steel one (more than 0.1% C) with a special flux; for this reason it would be reasonable to take silicon carbide (SiC), with the highest melting point of all in the first category, as its main constituent. Hence, as seen from Tables 1 and 2, SiC is found richest in the blending, a deficit amount being supplemented by graphite and silicon iron. Graphite acts as arc stabilizer but it causes an arc blow. To prevent an arc blow, a small amount of carbonate and silicate is added, while the short circuiting to the base metal is made uniform by rendering the globules in welding finer through control of addition and mix ratio of carbonate and silicate. Meanwhile, weldability has been improved by adopting the following ratio of mixing; the total of the first category mix and the second category mix is equal to 85–90%, the remaining 10–15% being mica and lime of the third category.

Addition of mica has the effect of facilitating the process of applying the core under pressure with a flux containing a 150–200 mesh powder (with a sharp edge) of silicon carbide.

Next, the results of butt-welding a pearlite cast iron using an electrode of the present invention are described. Using an electrode which was manufactured by coating a 4 mm. diameter steel core with such composition as given in Table 2 with a coating material having such composition as listed in Table 1 under the same conditions as described above, a 12 mm. pearlite cast iron was butt-welded in a V-groove. The resulting weld was cut along XY axis in FIG. 2A and the hardness distribution on the cut surface was measured by a Vickers microhardness gauge. For the sake of comparison, a similar butt-weld was made under similar conditions on a pearlite cast iron plate using another electrode for cast iron produced by a certain manufacturer using a special core (steel wire containing 3% silicon) as mentioned above; and a similar hardness measurement was conducted.

FIG. 2B gives the results of these measurements, which indicate that the hardness in the fusion zone between weld and base metal is considerably lower in the case of an electrode of the present invention having been used than in that of a cast iron electrode with a special core having been used. On the other hand, comparison of cut sections testifies as in Table 5 that better results are produced by an electrode of the present invention than by the other.

TABLE 5

| Properties of V butt weld | Tested arc electrode | |
|---|---|---|
| | Present invention | A certain Manufacturer's product using a special core |
| Vickers average | 242 | 260. |
| Machinability | Good | Good. |
| Blow-holes | None | Rather Many. |
| Color of fractured surface | Gray | Whitish gray. |

As stated above, the present invention relates to a cheap, coated arc welding electrode which can be produced by using a common carbon steel as core and applying it with the above-mentioned flux. Characterized by a far better performance than given by any product conventionally available on the market, this electrode is believed to make a great contribution to the industries in general.

What is claimed is:
1. An electrode for arc-welding cast iron, comprising a carbon steel core coated with a material consisting essentially of the following constituents:

| | Parts by weight |
|---|---|
| Silicon carbide | 10–65 |
| Ferro-silicon | 5–65 |
| Carbon | 5–40 |
| At least one fluoride | 5–20 |
| Conventional stability improving electrode coating materials and binder | 2–20 |

2. An electrode as claimed in claim 1, in which the fluoride constituent consists of at least one fluoride compound selected from the group consisting of the compounds of fluorine with an alkali metal and the compounds of fluorine with an alkaline earth metal.

3. An electrode as claimed in claim 1 in which said conventional electrode coating materials are selected from the group consisting of the oxides of alkali metals, the oxides of an alkaline earth metals, the oxides of divalent metals, the oxides of polyvalent metals, and the double salts and carbonates of alkali metals and of alkaline earth metals.

4. An electrode as claimed in claim 1 in which said carbon is in the form of graphite.

5. An electrode as claimed in claim 1 in which the silicon carbide, ferro-silicon, carbon and fluoride total to 85–90% of the total weight of the coating material.

6. An electrode as claimed in claim 1 in which said ferro-silicon coating contains at least 15% silicon.

7. An electrode as claimed in claim 1 in which said fluoride is selected from the group consisting of calcium fluoride, sodium fluoride, potassium fluoride, and cryolite.

8. An electrode for use in arc-welding cast iron comprising a carbon steel core coated with a material comprising in combination from 10–65% silicon carbide, from 5 to 65% ferro-silicon, and from 5–40% carbon.

9. An electrode as claimed in claim 8 in which said carbon is in the form of graphite and said ferro-silicon contains at least 15% silicon.

References Cited by the Examiner
UNITED STATES PATENTS

| 1,873,340 | 8/32 | Scollard et al. | 117—202 |
| 2,077,397 | 4/37 | Christensen | 117—206 |
| 2,213,390 | 9/40 | Franklin | 117—206 |

RICHARD D. NEVIUS, *Primary Examiner.*